Jan. 2, 1962  G. W. QUAST  3,015,621
INFLUENT APPARATUS FOR FLOTATION TANKS
Filed Dec. 3, 1959
FIG. 1.
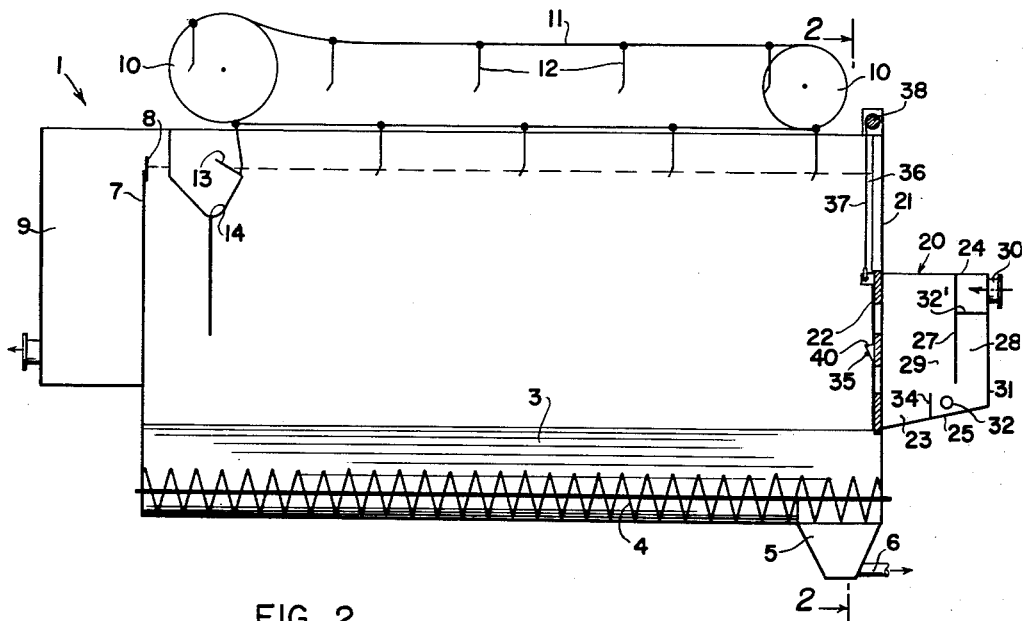
FIG. 2.
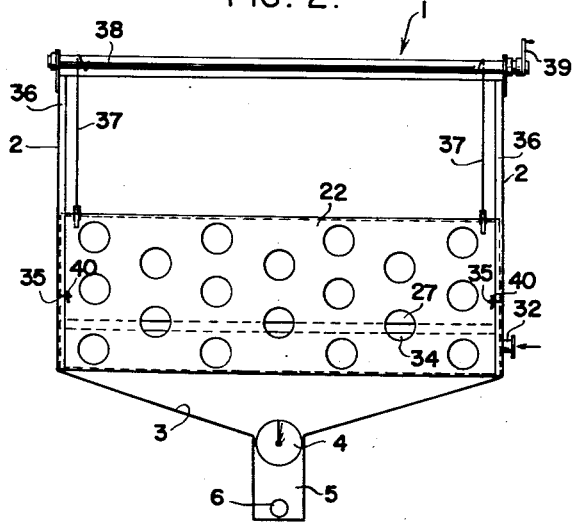
FIG. 3.
FIG. 4.
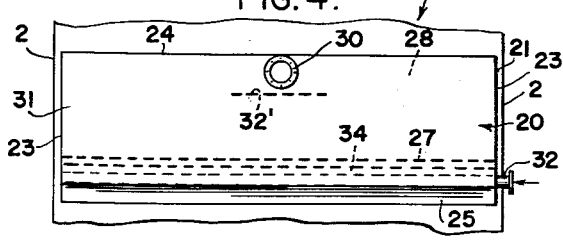
*INVENTOR.*
GILBERT W. QUAST
BY Ernst W. Schultz
*ATTORNEY*

United States Patent Office 3,015,621
Patented Jan. 2, 1962

3,015,621
INFLUENT APPARATUS FOR FLOTATION TANKS
Gilbert W. Quast, Brookfield, Wis., assignor to Chain Belt Company, Milwaukee, Wis., a corporation of Wisconsin
Filed Dec. 3, 1959, Ser. No. 857,060
7 Claims. (Cl. 210—205)

This invention relates to the separation of suspended solids or liquids from a liquid by flotation and particularly to means for mixing the suspension and air-charged liquid and for the introduction of the mixture into one end of the tank.

According to the present invention, a box-like structure is attached to the tank to extend across the end thereof and is provided with means for connection to the influent pipe. The structure is fitted with a lateral header for the air-charged mixture and a series of baffles which define a lateral distribution zone and a mixing zone which opens into the tank through a perforate baffle. The relative disposition of the baffles provides an efficient mixing zone and distribution of the liquids across the width of the tank for introduction into the tank with a minimum of or no turbulence and eddy currents in the quiescent zone of the tank.

The principal object of the invention is to provide a more efficient distribution and mixing of the suspension and air-charged liquid requiring a relatively small compact structure which may be separately fabricated and attached to the end of the tank. Generally, the invention contemplates a tank of steel construction although the invention should not be considered as limited thereto.

The drawings furnished herewith illustrate the best mode of carrying out the invention as presently contemplated and set forth hereinafter.

In the drawings:

FIGURE 1 is an outline drawing of the tank shown in vertical longitudinal cross-section.

FIG. 2 is a section taken on lines 2—2 of FIG. 1 to show the adjustable baffles extending across the box-like structure.

FIG. 3 is a plan view of the end of the tank including the box-like structure attached thereto; and FIG. 4 is an end view of the box-like structure and of a part of the tank.

The tank 1 shown in the drawings includes the sides 2 and the bottom 3 which slopes downwardly toward the conveyer screw 4 shown diagrammatically as extending the length of the tank. The material which settles on bottom 3 of the tank is pushed by screw 4 to sump 5 at one end of the tank and from which it is withdrawn by the pipe 6. The wall 7 at the opposite end of the tank is fitted with the adjustable weir 8 over which the clear effluent flows into the well 9 extending across the end of the tank. The sprockets 10 and chain 11 shown diagrammatically carry the series of flights 12 which push the floating material toward the inclined beach 13 fixed within the tank at the level of the weir 8. The material carried over the beach 13 by flights 12 is received by the scum trough 14 from which it may be periodically or continuously removed in the operation of the tank.

The present invention is directed to the box-like structure 20 fixed to end wall 21 of tank 1 and communicating with the quiescent zone of the tank through the removable perforate baffle 22 which is disposed over the opening provided in wall 21 of the tank. Box 20 includes the end walls 23, and the top and bottom 24 and 25 respectively, which are welded or may be bolted to tank 1.

The vertical baffle 27 in box 20 extends to the ends and top thereof and divides the interior of the box into the lateral distribution zone 28 and the mixing zone 29. The spacing between the lower edge of baffle 27 and bottom 25 provides an opening from zone 28 into zone 29 for the influent which is introduced into zone 28 through the pipe connection 30 provided near the top of the box in the forward wall 31 thereof. Pipe connection 30 is centrally located, as shown, respecting the ends of box 20 or several spaced connections may be provided for especially wide tanks. In tanks of moderate width, the single fitting with the small horizontal baffle 32' should be adequate to provide the lateral distribution of the flow across the bottom of vertical baffle 27.

The air-charged liquid used for the flotation process is introduced into box 20 by the header 32 having the end fitting 33 exteriorly of box 20 for connection to a pipe, not shown, by which the air-charged liquid is delivered to the tank. Header 32 extends across bottom 25 of box 20 on the side of baffle 27 nearer the tank and is provided with a series of orifices which direct the air-charged liquid in a series of small streams against the low, vertical baffle 34 located adjacent to and parallel with the header. Baffle 34 extends from bottom 25 of box 20 to about the height of the bottom edge of baffle 27 and directs the air-charged liquid upwardly in mixing zone 29 of the box so that, in effect, a curtain of air-charged liquid is placed in the path of the suspension entering zone 29 from beneath baffle 27. The two liquids are then mixed or blended in zone 29 in a rolling motion which generally sweeps across the top 24 of box 30 and then downwardly across the face of baffle 22. The mixed liquids then pass through the ports in baffle 22 to enter tank 1.

The ports in baffle 22 are sized to provide the desired distribution and flow into the tank and generally may require inspection and cleaning at infrequent intervals. For that purpose, baffle 22 is supported on the projections 35 fixed to side walls 2 alongside the opening provided in the wall 21 and is movable vertically between the guides 36 and wall 21. Various means for raising the baffle may be provided such as the cables 37 shown attached to the baffle and winding on the shaft 38 provided with the crank 39 and extending above and across the tank.

According to the invention, the box 20 provides the described, improved mixing action of the liquids in a relatively small mixing zone. A further important feature of the invention resides in the fact that the streams from header 32 prevent heavy solids or grit from settling out in front of baffle 34 and by lifting baffle 22 as by means of crank 39, an opening is provided beneath the baffle so that the flow therethrough sweeps out the solids which tend to settle on bottom 25 of box 20. Baffle 22 does not need to be raised more than a few inches and for only a few moments with no adverse effect upon the efficiency of the tank. Bottom 25 of box 20 may be inclined downwardly toward the tank in order to assure or promote settling in front of baffles 34 and 22, and the sump 5 is located immediately beneath baffle 22 to receive the solids directly therefrom.

Baffle 22 includes a cam plate 40 fixed to each end of the baffle to engage the corresponding projection 35 fixed to the tank side wall so that the baffle is held by its own weight against end wall 21 and over the opening provided therein.

Various modes of carrying out the invention are contemplated within the scope of the following claims particularly pointing out and distinctly claiming the subject matter which is regarded as the invention.

I claim:

1. In a tank for receiving a liquid carrying suspended material and for the separation thereof by flotation, said tank having an opening at one end extending substantially the width of the tank and spaced from the bottom and top thereof, a box-like structure attached to said end and over said opening of the tank and having a first vertical baffle dividing the box into a distribution zone and a mixing zone, and spaced from the bottom of the box to provide an opening therebetween, a removable perforate baffle disposed within the tank over said first opening and providing the controlled introduction of the suspension from said mixing zone into the tank, said box having means for connection to a pipe delivering the suspension to the tank and opening into said distribution zone, a lower vertical baffle spaced forwardly of said first baffle and extending from the floor of the box, and a header having means for connection to a source of air-charged liquid and extending within the box adjacent to the rear side of said lower baffle and having ports discharging the air-charged liquid against said lower baffle whereby the air-charged liquid impinges against said lower baffle and is directed upwardly to form a vertical curtain of air-charged liquid extending across the opening from said distribution zone into said mixing zone, and whereby the suspension in passing from beneath said first baffle and through the vertical curtain of air-charged liquid mixes therewith in a circulatory motion about an axis cross-wise of the tank before passing through said perforate baffle into the tank.

2. In a tank for the separation of suspended material from a liquid by air-flotation, said tank having an opening at one end extending substantially the width of the tank and spaced from the bottom and top thereof, a box having an open side attached to said end and over said opening of the tank, a first vertical baffle dividing the box into a distribution zone and a mixing zone and spaced from the bottom of the box to provide an opening between said zones, a removable perforate baffle disposed within the tank over said first opening and providing the controlled introduction of the suspension from said mixing zone into the tank, said box having means for connection to a pipe delivering the suspension to the tank and opening into said distribution zone, a lower vertical baffle spaced forwardly of said first baffle and extending from the floor of the box, a header having means for connection to a source of air-charged liquid and extending within the box adjacent to the rear side of said lower baffle and having ports opening in the direction of said lower baffle whereby the air-charged liquid is directed upwardly across the opening from said distribution zone into said mixing zone and whereby the suspension in passing from beneath said first baffle mixes therewith in a circulatory motion about an axis cross-wise of the tank before passing through said perforate baffle into the tank.

3. In a tank for the separation of suspended material from a liquid by air-flotation, said tank having an opening at one end extending substantially the width of the tank and spaced from the bottom and top thereof, an inlet box having an open front side attached to said end and over said opening of the tank, said box having a first vertical baffle dividing the same into a distribution zone and a mixing zone and spaced from the bottom of the box to provide an opening therebetween, a perforate baffle disposed within the tank over said first opening and providing the controlled introduction of the suspension from said mixing zone into the tank, said box having means for the back side near the top thereof for connection to a pipe delivering the suspension to the tank and opening into said distribution zone, a lower vertical baffle spaced forwardly of said first baffle and extending from the floor of the box, a header having means for connection to a source of air-charged liquid and extending within the box adjacent to the rear side of said lower baffle and having ports opening in the direction of said lower baffle whereby the air-charged liquid is directed upwardly across the opening from said distribution zone to join the suspension entering the mixing zone and mix with a circulatory motion about an axis cross-wise of the tank before passing together through said perforate baffle into the tank, said bottom sloping downwardly from the forward end thereof to said perforate baffle whereby solids settling on said floor tend to move downwardly toward said first or second baffle, said header serving to keep the floor clear of solids settling in front of said first baffle and means for lifting said perforate baffle to form a narrow temporary opening between the bottom edge thereof and the floor of the tank through which the solids settling ahead of the perforate baffle may be periodically swept by the flow through such temporary opening.

4. In a tank for the separation of suspended material from a liquid as by air-flotation, said tank having an opening in one end wall extending substantially the width of the tank and spaced from the bottom and top thereof, a box having an open side attached to said end wall and over said opening of the tank, a first vertical baffle dividing the box into a distribution zone and a mixing zone and spaced from the bottom of the box to provide an opening between said zones, a removable perforate baffle disposed within the tank over said first opening and providing the controlled introduction of the suspension from said mixing zone into the tank, said box having means for connection to a pipe delivering the suspension to the tank and opening into said distribution zone, a lower vertical baffle spaced forwardly of said first baffle and extending from the floor of the box, a header having means for connection to a source of air-charged liquid and extending within the box adjacent to the rear side of said lower baffle and having ports opening in the direction of said lower baffle whereby the air-charged liquid is directed upwardly across the opening from said distribution zone into said mixing zone and whereby the suspension in passing from beneath said first baffle mixes therewith in a circulatory motion about an axis cross-wise of the tank before passing through said perforate baffle into the tank, means normally holding said baffle against said wall of the tank and over said opening, and periodically operable hoisting means for selectively raising the baffle either a few inches to allow the flow below the lower edge of the opening to sweep out the box or to the top of the tank for cleaning and inspection.

5. In a tank for receiving a liquid carrying suspended material and for the gravity separation thereof, said tank having an opening in one end wall extending substantially the width of the tank and spaced from the bottom and top thereof, a box-like structure attached to said end wall and over said opening of the tank and having a first vertical baffle dividing the box into a distribution zone and a mixing zone and spaced from the bottom of the box to provide an opening therebetween, a removable perforate baffle disposed within the tank over said first opening and providing the controlled introduction of the suspension from said mixing zone into the tank, said box having means for connection to a pipe delivering the suspension to the tank and opening into said distribution zone, a lower vertical baffle spaced forwardly of said first baffle and extending from the floor of the box, and a header having means for connection to a source of air-charged liquid and extending within the box adjacent to the rear side of said lower baffle and having ports discharging the air-charged liquid against said lower baffle whereby the air-charged liquid impinges against said lower baffle and is directed upwardly to form a vertical curtain of air-charged liquid extending across the opening from said distribution zone into said mixing zone and whereby the suspension in passing from beneath said first baffle and through the vertical curtain of air-charged liquid mixes therewith in a circulatory motion about an axis cross-wise of the tank before passing through said perforate baffle into the tank, means normally holding said baffle against said wall of the tank and over said opening, and periodically operable hoisting means for selectively raising the baffle either a few inches to allow the flow below the lower edge of the opening to sweep out the box or to the top of the tank for cleaning and inspection.

6. In a tank for the separation of suspended material from a liquid by air-flotation, said tank having an opening at one end extending substantially the width of the tank and spaced from the bottom and top thereof, an inlet box having an open front side attached to said end and over said opening of the tank, said box having a first vertical baffle dividing the same into a distribution zone and a mixing zone and spaced from the bottom of the box to provide an opening therebetween, a perforate baffle disposed within the tank over said first opening and providing the controlled introduction of the suspension from said mixing zone into the tank, said box having means at the back side near the top thereof for connection to a pipe delivering the suspension to the tank and opening into said distribution zone, a lower vertical baffle spaced forwardly of said first baffle and extending from the floor of the box, a plate extending from said first baffle to the back side of the box below said pipe connection means and spaced from the ends of the box whereby the liquid entering the box flows in opposite directions below the top side of the box and is distributed from end to end of the box as the flow moves downwardly toward said lower vertical baffle, a header having means for connection to a source of air-charged liquid and extending within the box adjacent to the rear side of said lower baffle and having ports opening in the direction of said lower baffle whereby the air-charged liquid is directed upwardly across the opening from said distribution zone to join the suspension entering the mixing zone and mix with a circulatory motion about an axis cross-wise of the tank before passing together through said perforate baffle into the tank.

7. In a tank for the separation of suspended material from a liquid by air-flotation, said tank having an opening at one end extending substantially the width of the tank and spaced from the bottom and top thereof, an inlet box having an open front side attached to said end and over said opening of the tank, said box having a first vertical baffle dividing the same into a distribution zone and a mixing zone and spaced from the bottom of the box to provide an opening therebetween, a perforate baffle disposed within the tank over said first opening and providing the controlled introduction of the suspension from said mixing zone into the tank, said box having means at the back side near the top thereof for connection to a pipe delivering the suspension to the tank and opening into said distribution zone, a lower vertical baffle spaced forwardly of said first baffle and extending from the floor of the box, a plate extending from said first baffle to the back side of the box below said pipe connection means and spaced from the ends of the box whereby the liquid entering the box flows in opposite directions below the top side of the box and is distributed from end to end of the box as the flow moves downwardly toward said lower vertical baffle, a header having means for connection to a source of air-charged liquid and extending within the box adjacent to the rear side of said lower baffle and having ports opening in the direction of said lower baffle whereby the air-charged liquid is directed upwardly across the opening from said distribution zone to join the suspension entering the mixing zone and mix with a circulatory motion about an axis cross-wise of the tank before passing together through said perforate baffle into the tank, said bottom sloping downwardly from the forward end thereof to said perforate baffle whereby solids settling on said floor tend to move downwardly toward said first or second baffle, said header serving to keep the floor clear of solids settling in front of said first baffle and means for lifting said perforate baffle to form a narrow temporary opening between the bottom edge thereof and the floor of the tank through which the solids settling ahead of the perforate baffle may be periodically swept by the flow through such temporary opening.

References Cited in the file of this patent

UNITED STATES PATENTS

| | | |
|---|---|---|
| 2,118,157 | Camp | Mar. 24, 1938 |
| 2,697,384 | Craig et al. | Dec. 21, 1954 |
| 2,820,550 | Sorg | Jan. 21, 1958 |
| 2,920,763 | Lind et al. | Jan. 12, 1960 |
| 2,925,383 | Bradford | Feb. 16, 1960 |